United States Patent
Arunachalam et al.

(10) Patent No.: US 11,057,275 B1
(45) Date of Patent: Jul. 6, 2021

(54) METHOD AND SYSTEM FOR ACHIEVING HIGH AVAILABILITY OF A PRIMARY NETWORK CONTROLLER IN A NETWORK CONTROLLER CLUSTER USING DISTRIBUTED NETWORK DEVICE STATE INFORMATION

(71) Applicant: Arista Networks, Inc., Santa Clara, CA (US)

(72) Inventors: Sakti Aishwarya Arunachalam, San Jose, CA (US); Sudip Regmi, San Ramon, CA (US); Nader Lahouti, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 17/024,754

(22) Filed: Sep. 18, 2020

(51) Int. Cl.
- G06F 15/177 (2006.01)
- H04L 12/24 (2006.01)
- H04L 29/08 (2006.01)

(52) U.S. Cl.
CPC ...... H04L 41/0893 (2013.01); H04L 41/0816 (2013.01); H04L 41/12 (2013.01); H04L 67/1095 (2013.01)

(58) Field of Classification Search
CPC . H04L 41/0893; H04L 41/0816; H04L 41/12; H04L 67/1095
USPC ...................................................... 709/221
See application file for complete search history.

(56) References Cited

U.S. PATENT DOCUMENTS

| | | | |
|---|---|---|---|
| 7,299,237 B1 | 11/2007 | Clark et al. | |
| 7,586,929 B2 | 9/2009 | Mizutani et al. | |
| 7,774,440 B1 | 8/2010 | Bagrodia et al. | |
| 8,291,468 B1 | 10/2012 | Chickering | |
| 8,667,394 B1 | 3/2014 | Spencer | |
| 8,874,719 B1 | 10/2014 | Burnett et al. | |

(Continued)

FOREIGN PATENT DOCUMENTS

| | | |
|---|---|---|
| CN | 1490979 A | 4/2004 |
| CN | 101553797 A | 10/2009 |

OTHER PUBLICATIONS

Extended European Search Report issued in corresponding European Application 17172549.2, dated Oct. 25, 2017.

(Continued)

*Primary Examiner* — Atta Khan
(74) *Attorney, Agent, or Firm* — Chamberlain, Hrdlicka, White, Williams & Aughtry

(57) ABSTRACT

A method for managing a network controller cluster includes obtaining, by the network controller in a network controller cluster, network device state information (NDSI) from each network device of a plurality of network devices managed by the network controller cluster, storing the NDSI in a configuration file, receiving a notification that a second network controller in the network controller cluster has failed, wherein the second network controller has a role of primary network controller in the network controller cluster, making a first determination that a role of the network controller has changed to primary network controller in the network controller cluster, based on the first determination, loading the NDSI from the configuration file into a network controller state database on the network controller, and initiating operation of the network controller using the network controller state database.

20 Claims, 11 Drawing Sheets

(56) References Cited

U.S. PATENT DOCUMENTS

| | | |
|---|---|---|
| 9,003,292 B2 | 4/2015 | Smith et al. |
| 9,235,802 B1 | 1/2016 | Chamness et al. |
| 9,461,877 B1 | 10/2016 | Nadeau et al. |
| 9,697,172 B1 | 7/2017 | Somohano et al. |
| 10,003,629 B2 | 6/2018 | Pech et al. |
| 10,187,286 B2 | 1/2019 | Sigoure |
| 2004/0015609 A1 | 1/2004 | Brown et al. |
| 2004/0255028 A1 | 12/2004 | Chu et al. |
| 2004/0267916 A1* | 12/2004 | Chambliss .......... H04L 41/5038 709/223 |
| 2005/0204028 A1* | 9/2005 | Bahl .................. H04L 41/0873 709/223 |
| 2006/0036527 A1 | 2/2006 | Tinnirello et al. |
| 2006/0041494 A1 | 2/2006 | Tinnirello et al. |
| 2006/0041660 A1 | 2/2006 | Bishop et al. |
| 2006/0085507 A1 | 4/2006 | Zhao et al. |
| 2007/0226630 A1 | 9/2007 | Farid et al. |
| 2008/0089237 A1 | 4/2008 | Molen et al. |
| 2009/0172148 A1 | 7/2009 | Underwood |
| 2009/0228586 A1 | 9/2009 | Claise et al. |
| 2013/0235870 A1 | 9/2013 | Tripathi et al. |
| 2014/0075327 A1 | 3/2014 | Noel et al. |
| 2014/0269319 A1 | 9/2014 | DeCusatis et al. |
| 2014/0337000 A1 | 11/2014 | Asenjo |
| 2014/0337467 A1 | 11/2014 | Pech et al. |
| 2015/0074260 A1 | 3/2015 | Anand et al. |
| 2015/0092561 A1 | 4/2015 | Sigoure |
| 2015/0100675 A1 | 4/2015 | Davie et al. |
| 2015/0277953 A1 | 10/2015 | Xu |
| 2015/0358200 A1 | 12/2015 | Mahajan et al. |
| 2015/0358209 A1 | 12/2015 | Zhang et al. |
| 2016/0057052 A1 | 2/2016 | Zhang et al. |
| 2016/0154907 A1 | 6/2016 | Halabe et al. |
| 2016/0277272 A1 | 9/2016 | Peach et al. |
| 2017/0004221 A1 | 1/2017 | Olsen |
| 2017/0145061 A1 | 5/2017 | Lu et al. |
| 2017/0250951 A1 | 8/2017 | Wang et al. |
| 2017/0339002 A1 | 11/2017 | Sigoure et al. |

OTHER PUBLICATIONS

Notification of First Office Action issued in corresponding Chinese Application No. 201710369558.0, dated Nov. 22, 2019.

* cited by examiner

US 11,057,275 B1

METHOD AND SYSTEM FOR ACHIEVING HIGH AVAILABILITY OF A PRIMARY NETWORK CONTROLLER IN A NETWORK CONTROLLER CLUSTER USING DISTRIBUTED NETWORK DEVICE STATE INFORMATION

BACKGROUND

Network devices in a network, e.g., a datacenter network, are typically managed using a network controller. The network controller, as part of its management functionality, receives configuration information from one or more external applications and then provides this configuration information to the network devices in the network.

SUMMARY

In general, in one aspect, the invention relates to a method for managing network devices by network controllers in a network controller cluster. The method includes obtaining, by a network controller of a plurality of network controllers in the network controller cluster, network device state information (NDSI) from a network device of a plurality of network devices, wherein the network controller has a role of a non-primary network controller in the network controller cluster, storing the NDSI in a configuration file on the network controller, and after the storing: making a first determination that a role of the network controller has changed to primary network controller in the network controller cluster, based on the first determination, selecting the NDSI from the configuration file, loading, based on the selecting, the NDSI into a network controller state database on the network controller, and initiating, after the loading, management of the plurality of network devices by the network controller using the network controller state database.

In general, in one aspect, the invention relates to a non-transitory computer readable medium that includes instructions that, when executed by a processor on a network controller, perform a method. The method includes obtaining, by the network controller in a network controller cluster, network device state information (NDSI) from each network device of a plurality of network devices managed by the network controller cluster, wherein the network controller has a role of a non-primary network controller in the network controller cluster, storing the NDSI in a configuration file, and after the storing: receiving a notification that a second network controller in the network controller cluster has failed, wherein the second network controller has a role of primary network controller in the network controller cluster, in response to the notification, making a first determination that a role of the network controller has changed to primary network controller in the network controller cluster, based on the first determination, loading the NDSI from the configuration file into a network controller state database on the network controller, and after the loading, initiating operation of the network controller using the network controller state database.

In general, in one aspect, the invention relates to a method for managing a network controller. The method includes obtaining, by the network controller of a plurality of network controllers in a network controller cluster, network device state information (NDSI) from a network device of a plurality of network devices, wherein the network controller has a role of a non-primary network controller in the network controller cluster and a second network controller in the network controller cluster has a role of primary network controller, storing the NDSI in a configuration file on the network controller, after the storing: making a first determination that a role of the network controller has changed to primary network controller in the network controller cluster, based on the first determination, loading the NDSI from the configuration file into a network controller state database on the network controller, wherein the configuration file specifies that the network device was synchronized to the second network controller, and initiating, after the loading, operation of the network controller using the network controller state database.

DETAILED DESCRIPTION

Figure 1A:
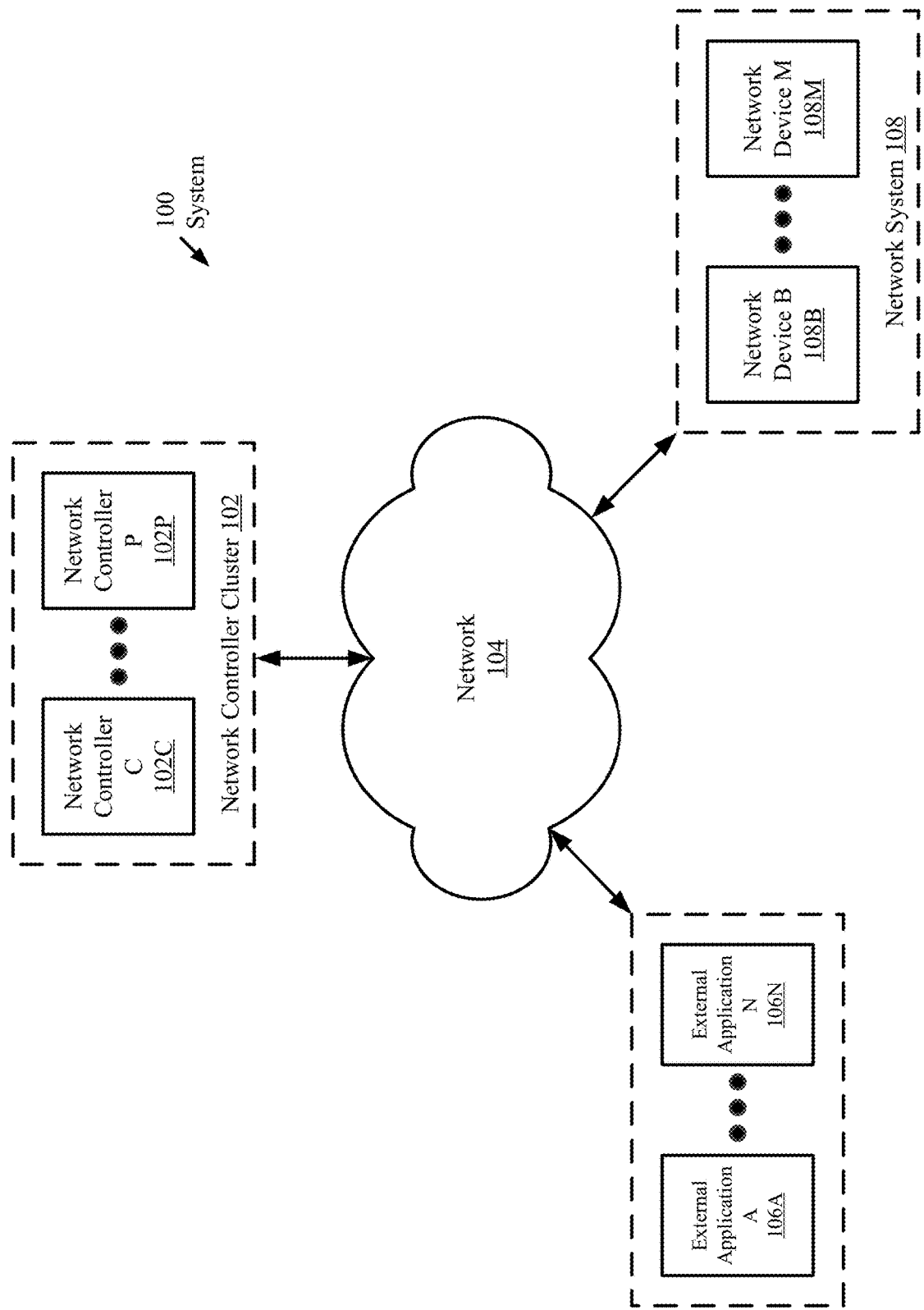
FIG. 1A shows a system in accordance with one or more embodiments described herein.

To provide redundancy in the event that the network controller fails (or otherwise becomes unavailable), one or more secondary network controllers (also referred to as non-primary network controllers) may be provisioned. These secondary network controllers remain inactive while the primary network controller is active. However, when the primary network controller fails, one of the secondary network controllers becomes the primary network controller. In this scenario, once the secondary network controller becomes the primary network controller, this network controller starts receiving configuration information from the external applications and provides this configuration information to the network devices. However, because this network controller (i.e., the network controller that is now the primary network controller) does not know: (i) what configuration information was previously sent to the network devices from the prior primary network controller or (ii) the current configuration of the network devices in the network, the network controller re-sends at least a portion of the previously sent configuration information to the network devices. This re-sending may continue until the network controller (i.e., the new primary network controller) is able to confirm the configuration of each of the network devices. Alternatively, the external applications may be required to confirm the configuration of each of the network devices (e.g., by replaying any configuration of the network devices as requested by the external applications). In some scenarios, the external applications may not be equipped to perform such replay and, as such, some configuration maintained by the primary network controller may be lost. Moreover, the prior approaches tend to result in a degradation of network performance during the period of time during which the new primary network controller is converging on the appropriate network configuration.

To address the aforementioned problem and/or other similar issues, embodiments of the invention relates to a system and method for distributing configuration information across a network controller cluster—i.e., a set of network controllers, where one of the network controllers is the primary network controller and the other network controllers are secondary network controllers. By distributing the configuration information, a secondary controller that assumes the role of a primary network controller (when the current primary controller fails), may be able to rapidly determine the current configuration information of the network devices.

The system may include at least one external application that sends commands to the network controller. An agent operating in the primary network controller may save the commands as data entries within its network controller state database. The storage of the data entries within the network controller state database may trigger the network controller (or more specifically, agents executing thereon) to process the data entries and then generate network device state information (NDSI), which is then sent to the network devices.

Upon receipt of the NDSI from the primary network controller, each network device, via network device agents operating in the network device, stores the received NDSI in their network device state database. The storage of the received NDSI within the local network device state database triggers the network device (or more specifically, agents executing thereon) to process the received NDSI and then generate and store the updated NDSI in their network device state database. The updated NDSI represents the portion of the state of the network device that has been updated. The network device may then operate in accordance with the updated NDSI. The updated NDSI (in response to it being stored in the network device state database) is transmitted to all network controllers (i.e., the primary and the secondary network controllers).

The primary network controller may store the updated NDSI received from the network device in its network controller database, while the secondary network controllers store the received NDSI in a configuration file (which is stored in a location that is external to its network controller state database). As discussed above, the storage of the updated NDSI in the network controller state database may trigger subsequent processing of the updated NDSI, which may in turn result in additional NDSI being sent to the network devices. Because all of the network controllers (both primary and secondary) operate in the same (or substantially the same) manner, the updated NDSI is not stored in the network controller state databases on the secondary network controllers; rather, the updated NDSI is stored in a configuration file. In this manner, the secondary network controllers have the NDSI for the network devices while not triggering processing of the NDSI on the secondary controllers.

In one embodiment, in the event of a failure of the primary network controller, the agents operating in each network device may be notified and a transfer of role of the primary network controller to a secondary network controller may be initiated. The transfer of the role of primary network controller to a secondary network controller may include selecting a secondary network controller to be the new primary network controller. Once the new primary network controller is selected, the new primary network controller reviews the configuration file (which is locally stored thereon) and selects NDSI of a network device from the network devices. The selection of the network devices may be based on a determination that the selected network device is a most updated network device. The determination may be made based on the mounted state information of each network device.

After the network device is selected, the secondary network controller may update its local network state database using the NDSI from the selected network device stored in a local configuration file. The aforementioned loading of the NDSI from the configuration file may allow the new primary network controller to have the most current or almost the most current NDSI in its network controller state database. In this manner, the aforementioned network controller state database may be able to rapidly take on the role of the primary network controller by minimizing the amount of commands to be resent from the external applications (i.e., commands sent to the previous primary network controller that may not have been propagated to the network devices).

After NDSI from the selected network device is loaded into the local network state database, the secondary controller may assume the operation of the primary network controller accordingly.

Various embodiments of the invention are described below.

FIG. 1A shows a system in accordance with one or more embodiments of the invention. The system (100) includes a network controller cluster (102) that includes two or more network controllers (102C, 102P) each operatively connected to one or more external applications (106A, 106N) and one or more network devices (108B, 108M) (the one or more network devices may be collectively referred to as a network system (108)) through a network (104). Each of these components is described below.

In one embodiment of the invention, the network controller cluster (102) may be one or more computing devices (e.g., network controllers (102C, 102P) that manage a network system (108). In one embodiment of the invention, each network controller (102C, 102P) is a computing device (see, e.g., FIG. 4)

In one embodiment of the invention, each network controller (102C, 102P) is a physical or virtual device that may be used for performing various embodiments of the invention. The physical device may correspond to any physical system with functionality to implement one or more embodiments of the invention. For example, the physical device may be a server (i.e., a device with at least one or more processor(s), memory, and an operating system) that is directly (or operatively, e.g., via the network) connected to at least one external application (e.g., 106A, 106N) and at least one network device (e.g., 108B, 108M).

Alternatively, the physical device may be a special purpose computing device that includes one or more application-specific processor(s) (or hardware) configured to only execute embodiments of the invention. In such cases, the physical device may implement embodiments of the invention in hardware as a family of circuits and may retain limited functionality to receive input and generate output in accordance with various embodiments of the invention. In addition, such computing devices may use a state-machine to implement various embodiments of the invention.

In another embodiment of the invention, the physical device may correspond to a computing device that includes one or more general purpose processor(s) and one or more application-specific processor(s) (or hardware). In such cases, one or more portions of the invention may be implemented using the operating system and general purpose processor(s), while one or more portions of the invention may be implemented using the application-specific processor(s) (or hardware).

In one embodiment of the invention, the network controller in the network controller cluster (102) includes executable instructions (stored in a non-transitory computer readable medium (not shown)), which when executed, enable the network controllers to perform one or more methods described below (see e.g., FIGS. 2A, 2C, and 2D). Additional detail about the network controller cluster is described below with respect to FIG. 1B.

In one embodiment of the invention, one of the network controllers (102C, 102P) in the network controller cluster (102) operates as the primary network controller. The primary network controller may be a network controller (e.g., 102C, 102P) that includes functionality for storing commands obtained from the external application(s) (106A, 106N), sending NDSI to one or more network devices (108B, 108M), receiving updated NDSI, and storing the updated NDSI in the local network controller databases of the network devices (see e.g., FIG. 1B). The other network controllers in the network controller cluster operate as the non-primary or secondary network controllers.

In one embodiment of the invention, the one or more external applications (106A, 106N) may each be a computing device (see e.g., FIG. 4) or virtual instance (discussed above) that is configured to interact with the network controller cluster (102) or, more specifically, with the primary network controller. In one embodiment of the invention, an external application includes functionality to send commands to the primary network controller in the network controller cluster (102).

In one embodiment of the invention, the one or more network device(s) (108B, 108M) are physical devices that include persistent storage, memory (e.g., random access memory), one or more processor(s) (including a switch chip), and two or more physical ports. In one embodiment of the invention, the switch chip is hardware that determines which egress port on a network device to forward media access control (MAC) frames. The switch chip may include egress and ingress ports that may connect to ports on the network device. Each port may or may not be connected to another device on a network device on the network (104) (e.g., a server, a switch, a router, etc.). The network device may be configured to receive packets via the ports and determine whether to: (i) drop the packet; (ii) process the packet in accordance with one or more embodiments of the invention; and/or (iii) send the packet, based on the processing, out another port on the network device.

How the network device makes the determination about whether to drop the packet, and/or send the packet to another device on the network depends, in part, on whether the network device is a layer-2 (L2) switch or a layer-3 (L3) switch (also referred to as a multilayer switch), which may perform at least some functions of a router. If the network device is operating as a L2 switch, the network device uses the destination MAC address along with a forwarding table to determine out of which port to send the packet. If the network device is operating as a L3 switch, the network device uses the destination Internet Protocol (IP) address along with a routing table to determine out of which port to send the packet, and includes the ability to write the MAC address of the next device to receive the packet in place of its own MAC address (which the last device to send the packet wrote) in the L2 information encapsulating the packet. If the network device is a multilayer switch, the multilayer switch includes functionality to process packets using both MAC addresses and IP addresses.

In one embodiment of the invention, the persistent storage in the network device may include any type of non-transitory computer readable medium that includes instructions, which, when executed by one or more processor(s) in the network device, enable the network device to perform all or a portion of the functions described in accordance with one or more embodiments of the invention (see e.g., FIGS. 2A-3C).

Examples of network devices include, but are not limited to, a router, a switch, and a multilayer switch. The network device is not limited to the aforementioned specific examples. Additional detail about a network device is described below with respect to FIG. 1C.

In one embodiment of the invention, the network (104) may be the medium through which the network controller cluster (102), the one or more external application(s) (106A, 106N), and the one or more network device(s) (108B, 108M) are operatively connected. In one embodiment of the invention, the network may include other network devices (or systems) (not shown) that facilitate communication between the aforementioned components. As such, in one embodiment of the invention, the network may include any combination of local and/or wide area (e.g., Internet) network segments that may be wire-based and/or wireless and that may use any combination of wired and/or wireless communication protocols.

The invention is not limited to the system shown in FIG. 1A. More specifically, while the system shown in FIG. 1A includes a single network controller cluster, embodiments of the invention may be implemented using multiple network controller clusters, where the multiple network controller clusters are configured such that if one of the multiple network controller clusters fails, the other network controller clusters may continue to operate and provide the functionality described below to the client entities (e.g., external applications or client processes (described below)) and the network devices.

Figure 1B:
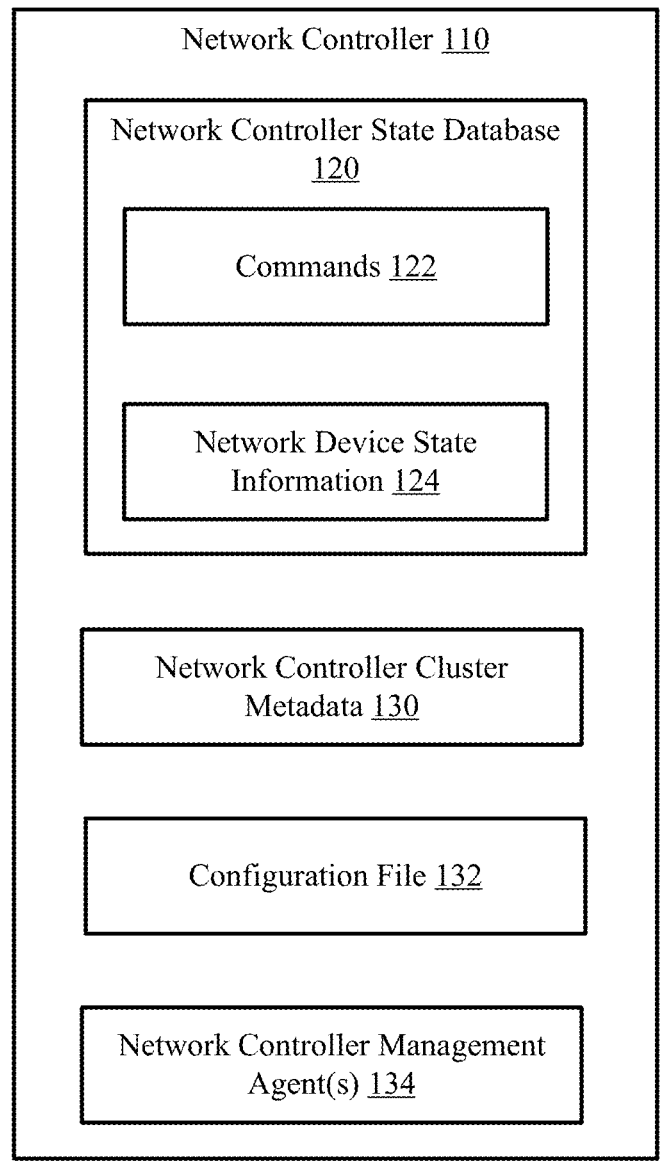
FIG. 1B shows a diagram of a network controller in accordance with one or more embodiments disclosed herein.

FIG. 1B shows a network controller in accordance with one or more embodiments of the invention. The network controller (110) includes a network controller state database (120), network controller cluster metadata (130), a configuration file (132), and one or more network controller management agents (134). The network controller (110) may include additional, fewer, and/or different components without departing from the invention. Each of the components illustrated in FIG. 1B is described below.

In one embodiment of the invention, the network controller state database (120) includes NDSI (124) of one or more network devices (see, e.g., 108B, 108M, FIG. 1A). The NDSI (124) may be the state of each of the network devices (see e.g., 108B, 108M in FIG. 1A) to which the network controller (102) manages. Said another way, the network controller state database may serve as a repository for consolidate state information pertaining to each of the network devices under the supervision of the network controller. The aforementioned information may be collectively referred to as network device state information (NDSI). In one embodiment of the invention, the state of each of the network devices (also referred to as the NDSI for each of the network devices) may include: (i) state information that has been provided to the network controller by the network device; and (ii) the state information obtained from the one or more external applications (see e.g., FIG. 1A) that is being sent to (or is scheduled to be sent to) the network controller. Accordingly, the state of a network device (as specified in the network device state database (see e.g., 152 in FIG. 1C)) and the state of the network device maintained in the network controller state database may be different. The aforementioned differences may be the result of state changes that have been made on the network device that have not been propagated to the network controller and/or state changes that are scheduled to be sent to the network device but have yet to be sent.

In one embodiment of the invention, the network controller state database (120) may be implemented using any type of database (e.g., a relational database, a distributed database, etc.). Further, the network controller state database may be implemented in-memory (i.e., the contents of the network controller state database may be maintained in volatile memory). Alternatively, the network controller state database may be implemented using persistent storage. In another embodiment of the invention, the network controller state database may be implemented as an in-memory database with a copy of the network controller state database being stored in persistent storage. In such cases, as changes are made to the in-memory database, copies of the changes (with a timestamp) may be stored in persistent storage. The use of an in-memory database may provide faster access to the contents of the network controller state database.

Those skilled in the art will appreciate that while the term "database" is used above, the network controller state database (120) may be implemented using any known or later developed data structure(s) to manage and/or organize the content in the network controller state database (120).

In one embodiment of the invention, the network controller state database (120) includes commands (122). The commands (122) are commands obtained from the external applications (e.g., 106A, 106N). The commands (122) may specify altering the NDSI of one or more network devices. The commands (122) being stored in the network controller state database (120) may result in one or more network controller management agent(s) (134) initiating the sending of one or more data entries to the one or more network devices.

In one embodiment of the invention, the NDSI (124) of the network device(s) that is stored in the network controller state database (120) may include, but is not limited to: (i) information about (and/or generated by) all (or a portion of) services currently executing on the network device; (ii) the version of all (or a portion of) software executing on the network device; (iii) the version of all (or a portion of) firmware on the network device; (iv) hardware version information for all (or a portion of) hardware in the network device; and (v) information about all (or some) of the services, protocols, and/or features configured on the network device (e.g., show command service (SCS), multi-chassis link aggregation (MLAG), link aggregation control protocol (LACP), virtual extensible local area network (VXLAN), link layer discovery protocol (LLDP), tap aggregation, data center bridging (DCB) capability exchange, access control list (ACL), virtual local area network (VLAN), virtual router redundancy protocol (VRRP), virtual address resolution protocol (VARP), spanning tree protocol (STP), open shortest path first (OSPF), border gateway protocol (BGP), routing information protocol (RIP), bidirectional forwarding detection (BFD), multi-protocol label switching (MPLS), protocol independent multicast (PIM), Internet control message protocol (ICMP), Internet group management protocol (IGMP), etc.), where this information may include information about the current configuration and status of each of the services, protocols, and/or features. In one embodiment of the invention, the network controller state database includes control plane state information associated with the control plane of the network device (e.g., the current list of static routes, current contents of the routing information base (RIB), the current content of the link state database, the current contents of the neighbor table, etc.). Further, in one embodiment of the invention, the network controller state database includes data plane state information associated with the data plane of the network device (e.g., the current contents of the forwarding information base (FIB)). The NDSI (124) in the network controller state database (120) may include other information without departing from the invention.

In one embodiment of the invention, the NDSI (124) in the network controller may be shared with one or more network device(s) using an asynchronous replication mechanism. More specifically, when NDSI (124) is changed in the network controller, the changed state information is first stored in the network controller state database (120), and then a copy of the changed state information is transmitted to the one or more network device(s) (e.g., in accordance with the method illustrated in FIG. 2A). The transmission of the state information to the one or more network devices may involve pushing the updated NDSI, by one of the network controller management agents (134), to the one or more network devices. Additionally, or alternatively, the transmission of the state information to the one or more network devices may involve sending a notification, by one of the network controller management agents (134), to the one or more network devices. In response to receiving the notification, a network device agent (not shown) subsequently pulls the updated state information from the network controller state database (120).

Figure 2A:
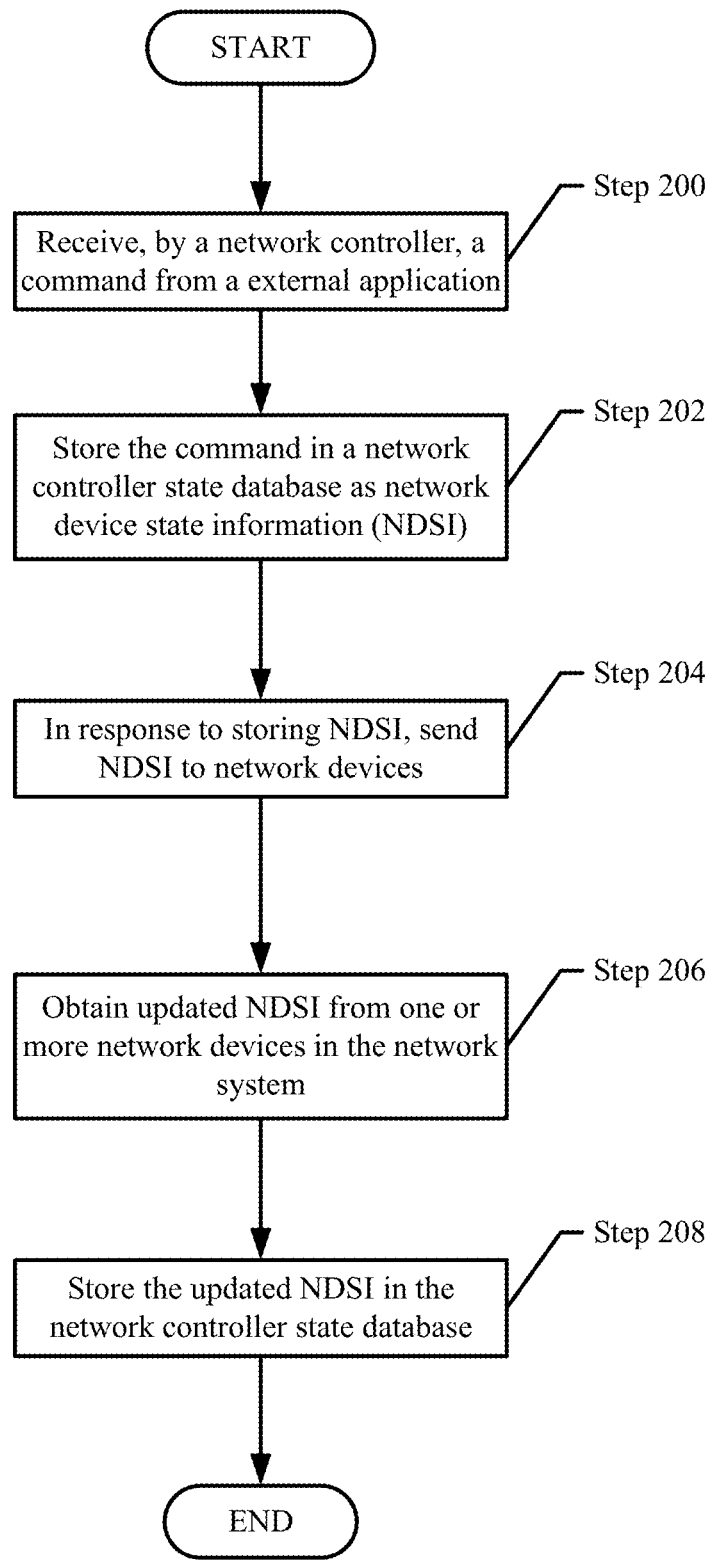
FIG. 2A shows a flowchart describing a method for processing commands by a primary network controller in accordance with one or more embodiments described herein.
Figure 2B:
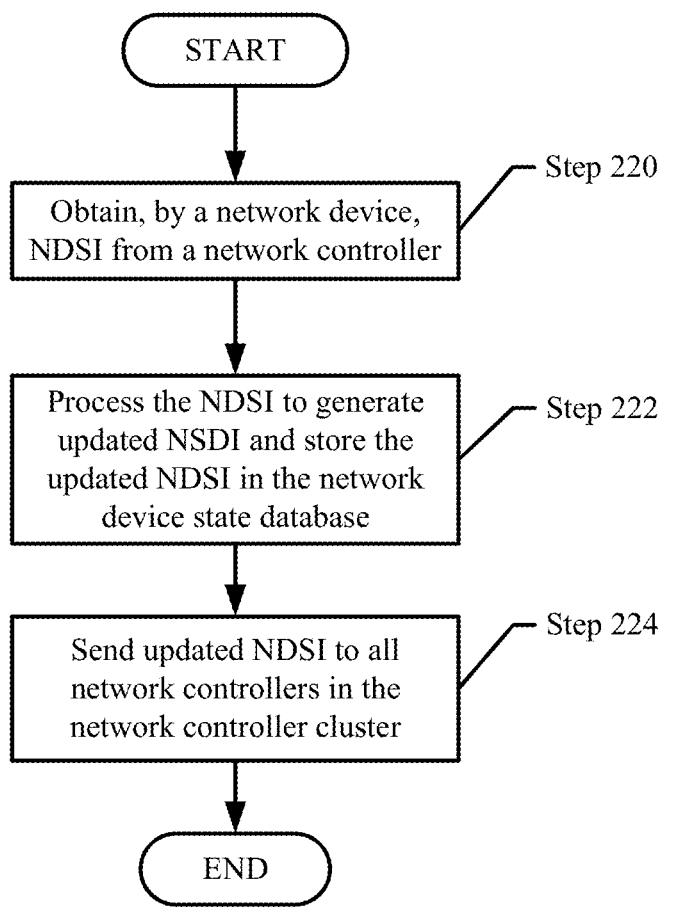
FIG. 2B shows a flowchart describing a method for processing network device state information (NDSI) in accordance with one or more embodiments described herein.
Figure 2C:
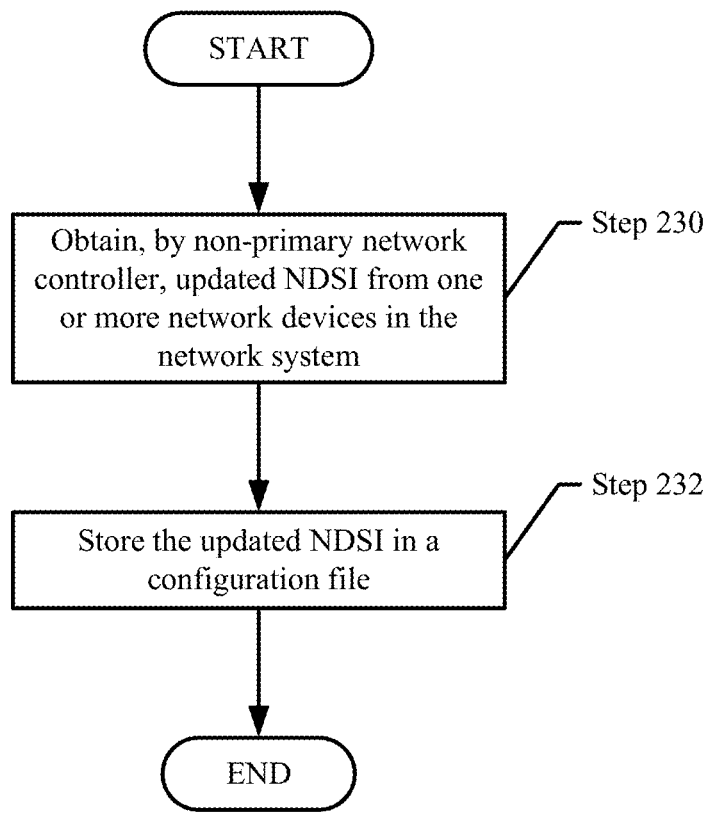
FIG. 2C shows a flowchart describing a method for processing NDSI by a non-primary network controller in accordance with one or more embodiments described herein.
Figure 2D:
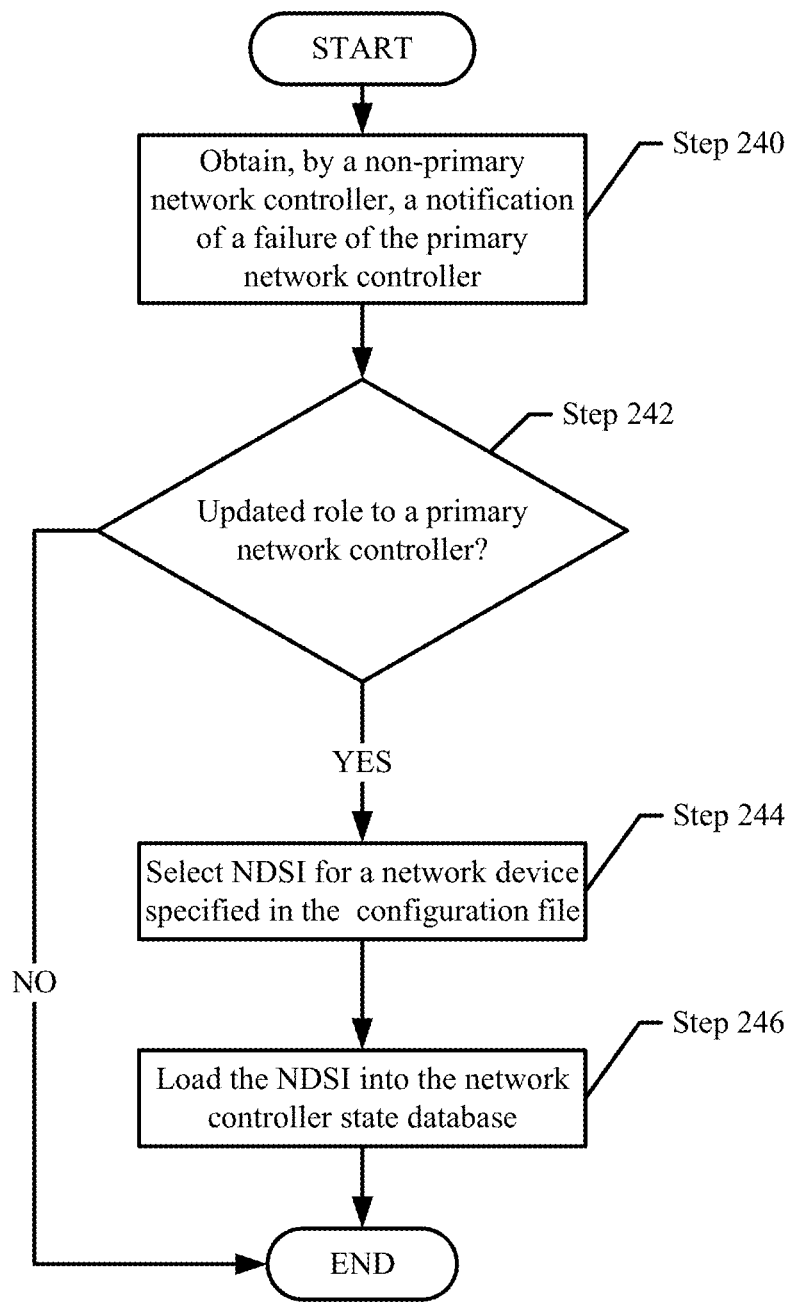
FIG. 2D shows a flowchart describing a method for assuming the role of primary network controller in accordance with one or more embodiments described herein.

In one embodiment of the invention, the network controller state database (120) is not populated until the network controller (110) is updated to the role of primary network controller (e.g., as determined in FIG. 2D). If the network controller (110) is not assigned the role of primary network controller (120) (i.e., the network controller (110) is a non-primary network controller), the network controller state database (120) may not store the NDSI (124) of the one or more network devices. Further, the network controller (110) may not store the commands (122) in the network controller state database (120). In such embodiments in which the network controller is a non-primary network controller, any obtained NDSI from the one or more network devices are stored in the configuration file (132) (discussed below).

In one embodiment of the invention, the network controller cluster metadata (130) is a data structure that specifies information associated with the network controller cluster (e.g., 102, FIG. 1A). The information may include, for example, identifiers for each active, or otherwise available, network controller in the network controller cluster, the network controller that is assigned the role of primary network controller, the network controller that is to be assigned the role of primary network controller in the event of a failure by the current primary network controller, and/or any other information associated with the network controller cluster without departing from the invention. In one embodiment of the invention, as the network controllers in the network controller cluster get added, removed, or assigned the role of primary network controller, the network controller cluster metadata (130) is updated accordingly.

In one embodiment of the invention, the network controller management agent(s) (134) interacts with the network controller state database (120). Each network controller management agent facilitates the implementation of one or more protocols, services, and/or features of the network controller (110). Examples of network controller agents, include, but are not limited to, a bug-alerts agent, a policy agent that manages access control lists, a user interface agent, a routing information base agent, a forwarding information base agent, and a simple network management protocol (SNMP) agent. Furthermore, each network controller agent includes functionality to access various portions of the network controller state database (120) in order to obtain the relevant portions of the state of one or more network device(s) in order to perform various functions. Additionally, each network controller management agent (134) includes functionality to update the state of the one or more network device(s) by writing new and/or updated values in the network controller state database (120), corresponding to one or more variables and/or parameters that are currently specified in the one or more network device(s).

In one embodiment of the invention, the configuration file (132) stores NDSI of one or more network devices. The configuration file (132) may be populated with the NDSI as it is obtained by the network controller (110) from one or more network devices. In one embodiment of the invention, if the network controller (110) is a non-primary network controller, the NDSI is not transferred to the network controller state database (120). In such embodiment, if the network controller becomes assigned the role of primary network controller, one or more NDSI in the configuration file (132) may be uploaded to the network controller state database (120) in accordance with, e.g., the method illustrated in FIG. 2D.

In one embodiment, the configuration file specifies whether each NDSI of a network device is synchronized (discussed in FIG. 2B) to the NDSI of the primary network controller. The NDSI in the configuration file (132) that is synchronized to that of the primary controller may be tagged as such.

In one or more embodiments of the invention, the network controller management agents (134) may also include functionality to detect the aforementioned changes to the network controller database and propagate (or initiate propagation of) these changes to the appropriate network device(s).

Figure 1C:
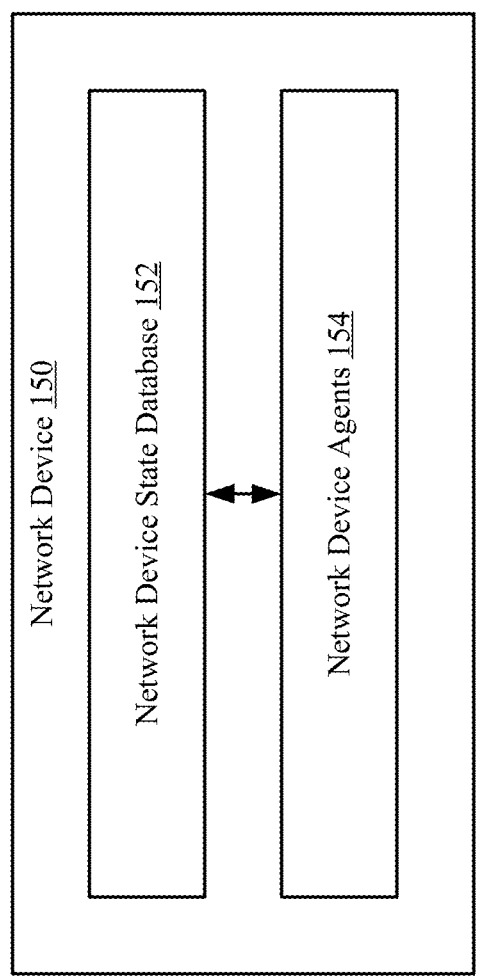
FIG. 1C shows a diagram of a network device in accordance with one or more embodiments disclosed herein.

FIG. 1C shows a network device in accordance with one or more embodiments of the invention. The network device (150) may be an embodiment of a network device (108B, 108M) discussed below. The network device (150) includes a network device state database (152) and one or more network device agents (154). Each of these components is described below.

In one embodiment of the invention, the network device state database (152) includes the current state of the network device (150). The state information stored in the network device state database may include, but is not limited to: (i) information about (and/or generated by) all (or a portion of the) services currently executing on the network device; (ii) the version of all (or a portion of the) software executing on the network device; (iii) the version of all firmware on the network device; (iv) hardware version information for all (or a portion of the) hardware in the network device; (v) information about the current state of all (or a portion of the) tables (e.g., routing table, forwarding table, etc.) in the network device that are used to process packets, where information may include the current entries in each of the tables, and (vi) information about all (or a portion of the) services, protocols, and/or features configured on the network device (e.g., show command service (SCS), MLAG, LACP, VXLAN, LLDP, tap aggregation, data center bridging capability exchange, ACL, VLAN, VRRP, VARP, STP, OSPF, BGP, RIP, BDF, MPLS, PIM, ICMP, IGMP, etc.), where this information may include information about the current configuration and status of each of the services, protocols, and/or features. In one embodiment of the invention, the network device state database includes control plane state information (discussed above) associated with the control plane of the network device. Further, in one embodiment of the invention, the network device state database includes data plane state information (discussed above) associated with the data plane of the network device. The network device state database may include other information without departing from the invention.

In one embodiment of the invention, the network device state database (152) may be implemented using any type of database (e.g., a relational database, a distributed database, etc.). Further, the network device state database may be implemented in-memory (i.e., the contents of the network device state database may be maintained in volatile memory). Alternatively, the network device state database may be implemented using persistent storage. In another embodiment of the invention, the network device state database may be implemented as an in-memory database with a copy of the network device state database being stored in persistent storage. In such cases, as changes are made to the in-memory database, copies of the changes (with a timestamp) may be stored in persistent storage. The use of an in-memory database may provide faster access to the contents of the network device state database.

Those skilled in the art will appreciate that while the term "database" is used above, the network device state database (152) may be implemented using any known or later developed data structure(s) to manage and/or organize the content in the network device state database.

In one embodiment of the invention, the state information from the individual network devices may be shared with the network controller using an asynchronous replication mechanism. More specifically, when state information is changed in the network device, the changed state information is first stored in the network device state database, and then a copy of the changed state information is transmitted (via a push or pull mechanism) to the network controller.

In one embodiment of the invention, one or more network device agents (154) interact with the network device state database (152). Each network device agent facilitates the implementation of one or more protocols, services, and/or features of the network device (150). Examples of network device agents, include, but are not limited to, a routing information base agent, a forwarding information base agent, and a simple network management protocol (SNMP) agent.

Furthermore, each network device agent includes functionality to access various portions of the network device state database (152) in order to obtain the relevant portions of the state of the network device in order to perform various functions. Additionally, each network device agent includes functionality to update the state of the network device by writing new and/or updated values in the network device state database, corresponding to one or more variables and/or parameters that are currently specified in the network device.

One skilled in the art will recognize that the architecture of the system, a network controller, a network device, and of the network is not limited to the components shown in FIGS. 1A-1C. For example, the network may include any number and any type of network devices participating in the sharing of states. Further, the network controller and the network devices may include components not shown in FIGS. 1B and 1C, respectively.

FIG. 2A shows a flowchart describing a method for processing commands by a primary network controller in accordance with one or more embodiments described herein. The method of FIG. 2A may be performed by, for example, a network controller (e.g., 110, FIG. 1B) that assumes the role of primary network controller. Other components illustrated in FIGS. 1A-1C may perform the method of FIG. 2A without departing from the invention. Further, one or more steps in FIG. 2A may be performed concurrently with one or more steps in FIGS. 2A-2D.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 200, a command is received from an external application. In one embodiment, the command may specify transmitting, transferring, or otherwise sending data to the network and/or across the network. The command may specify NDSI of one or more network devices connected using the network. The NDSI may be an update to NDSI stored in one or more network devices. For example, the update may be a change in any value in the network device state database. Examples of changes in the state information may include, but are not limited to, a new entry is added to a forwarding table, an entry is deleted from a forwarding table, a new protocol is being implemented on the network device, and the status of a service on the network device has changed (e.g., from active to in-active).

In step 202, the command is stored in a network controller state database as network device state information. In one embodiment, the command stored as the NDSI may be accessed by one or more network controller management agents.

In step 204, in response to storing the NDSI, NDSI is sent to one or more network devices. In one embodiment of the invention, a network controller management agent accesses the network controller state database to identify the command and/or the NDSI stored as a result of the command. The network controller management agent may send the NDSI, which may be new NDSI relative to a network device, to the network device. The one or more network devices to which the NDSI is sent may be all or a portion of the network devices in the network system. Which network device(s) the NDSI is sent to may be predetermined by the primary network controller.

In step 206, updated NDSI is obtained from one or more network devices in the network system. In one embodiment of the invention, the obtained updated NDSI may be NDSI updated as a result of the network device(s) processing the NDSI sent in step 204. The one or more network devices obtaining the updated NDSI may be, for example, all of the one or more network devices that obtained the NDSI in step 204.

In step 208, the updated NDSI is stored in the network controller state database. In one embodiment of the invention, the updated NDSI, similar to the NDSI of the command, may be accessed by one or more network controller management agents.

In one embodiment of the invention, the storing of the updated NDSI triggers a synchronization analysis. The synchronization analysis may include determining whether the data (e.g., the NDSI) associated with the command obtained from the external application (which was stored in the network controller state database in Step 202) and the updated NDSI obtained from each of the one or more network devices (obtained in Step 206) is identical. The aforementioned analysis is performed on a per-network device basis. Specifically, if the command and the updated NDSI match, then the network device is determined to be synchronized. In response to a determination that a given network device is synchronized, the primary network controller generates sync information and stores this information in the network controller state database. The sync information identifies the network device and includes a timestamp, which indicates when the sync information was generated.

The sync information, once stored in the network controller state database, is processed like all other NDSI stored in the network controller database. Specifically, the storage of the sync information results in the network device controller performing step 204.

FIG. 2B shows a flowchart describing a method for processing NDSI in accordance with one or more embodiments described herein. The method of FIG. 2B may be performed by, for example, a network device (e.g., 150, FIG. 1C. Other components illustrated in FIGS. 1A-1C may perform the method of FIG. 2B without departing from the invention. Further, one or more steps in FIG. 2B may be performed concurrently with one or more steps in FIGS. 2A-2D.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 220, NDSI is obtained from a network controller. The NDSI may be the NDSI sent by the network controller in step 204 of FIG. 2A. As discussed above, the NDSI may correspond to command received from an external application, sync information, or any other information.

In step 222, the NDSI is processed to generate updated NDSI. The NDSI is stored in the network device state database. In one embodiment, the network device processes the NDSI by writing the obtained updated NDSI to an outgoing state module of the network device. For example, if the obtained NDSI specifies a change in a value in the state information, the state information of the NDSI in the network device may be updated with the changed value. The writing of the detected changed state information may be event-triggered, e.g., the network device may write the obtained updated NDSI to the outgoing state module once the obtained NDSI is detected.

In step 224, the updated NDSI is sent to all network controllers (i.e., the primary network controller as well as the secondary network controllers) in the network controller cluster. In one embodiment of the invention, the network device identifies the network controllers in the network controller cluster. The network controllers may be identified using, for example, network controller cluster metadata. The network controller metadata may be obtained, or otherwise accessed, from the network controller sending the NDSI.

FIG. 2C shows a flowchart describing a method for processing NDSI by a non-primary network controller in accordance with one or more embodiments described herein. The method of FIG. 2C may be performed by, for example, a network controller (e.g., 110, FIG. 1B) that assumes the role of non-primary (or secondary) network controller. Other components illustrated in FIGS. 1A-1C may perform the method of FIG. 2C without departing from the invention. Further, one or more steps in FIG. 2C may be performed concurrently with one or more steps in FIGS. 2A-2D.

While the various steps in the flowchart shown in FIG. 2C are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 230, updated NDSI is obtained from one or more network devices in the network device system. The NDSI may be obtained using the network controller management agent(s). The network controller management agent(s) may utilize, for example, incoming state modules in the network controllers to obtain the updated NDSI.

In step 232, the updated NDSI is stored in a configuration file of the NDSI. In one embodiment of the invention, as discussed above, the configuration file is a separate data structure from the network controller state database. Because the network controller management agent(s) access the network controller state database and not the configuration file when sending NDSI to other network devices, the storing of the NDSI in the configuration file will not result in the non-primary network controller sending NDSI to the one or more network devices.

FIG. 2D shows a flowchart describing a method for processing NDSI by a non-primary network controller in accordance with one or more embodiments described herein. The method of FIG. 2D may be performed by, for example, a network controller (e.g., 110, FIG. 1B) that initially assumes the role of non-primary network controller. Other components illustrated in FIGS. 1A-1C may perform the method of FIG. 2D without departing from the invention. Further, one or more steps in FIG. 2D may be performed concurrently with one or more steps in FIGS. 2A-2D. The method shown in FIG. 2D may be performed concurrently by all non-primary network controllers in the event of a failure of the primary network controller.

While the various steps in the flowchart shown in FIG. 2D are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In step 240, the non-primary network controller obtains a notification of a failure of the primary network controller. In one embodiment of the invention, the notification is obtained from a second network controller. The second network controller may be a network controller that identified the failure, identified the first network controller as the network controller to be assigned the role of primary network controller in the event that the current primary network controller fails, and sent the notification to the non-primary network controller. Step 240 may not performed in scenarios in which the non-primary network controller itself detects the failure of the primary network controller. In such scenarios, the network controller may generate and the aforementioned notification to other non-primary network controllers.

In step 242, a determination is made about whether the role of the network controller is updated to that of primary network controller. The determination may be made using network controller cluster metadata. As discussed above, the network controller cluster metadata specifies the network controller assigned to be the next primary network controller in the event of a failure of the current primary network controller. If the role of the network controller is updated to that of primary network controller, the method proceeds to step 244; otherwise, the method ends following step 242.

In step 244, NDSI for a network device specified in the configuration file is selected. In one embodiment, the NDSI is selected from a set of one or more NDSI that are specified as being synchronized with that of the previous primary network controller at the time of the failure of the previous primary network controller. This determination may be made using the aforementioned sync information. The NDSI may be selected from that set of NDSI that is denoted as synchronized, e.g., at random. The remaining NDSI in the configuration file (i.e., the NDSI for the non-selected network device(s) is not used as part of this process).

In step 246, the selected NDSI is loaded to the network controller state database. In one embodiment of the invention, the selected NDSI is stored in the network controller stated database by the network controller management agent(s) in the network controller. The selected NDSI, in response to being stored in the network controller state database, may now be accessed by the network controller management agent(s) to trigger sending NDSI to network device(s) in the network system. Following step 246, the newly determined primary network controller starts performing the method described in FIG. 2A. This includes receiving commands from the external application(s).

Example

Figure 3A:
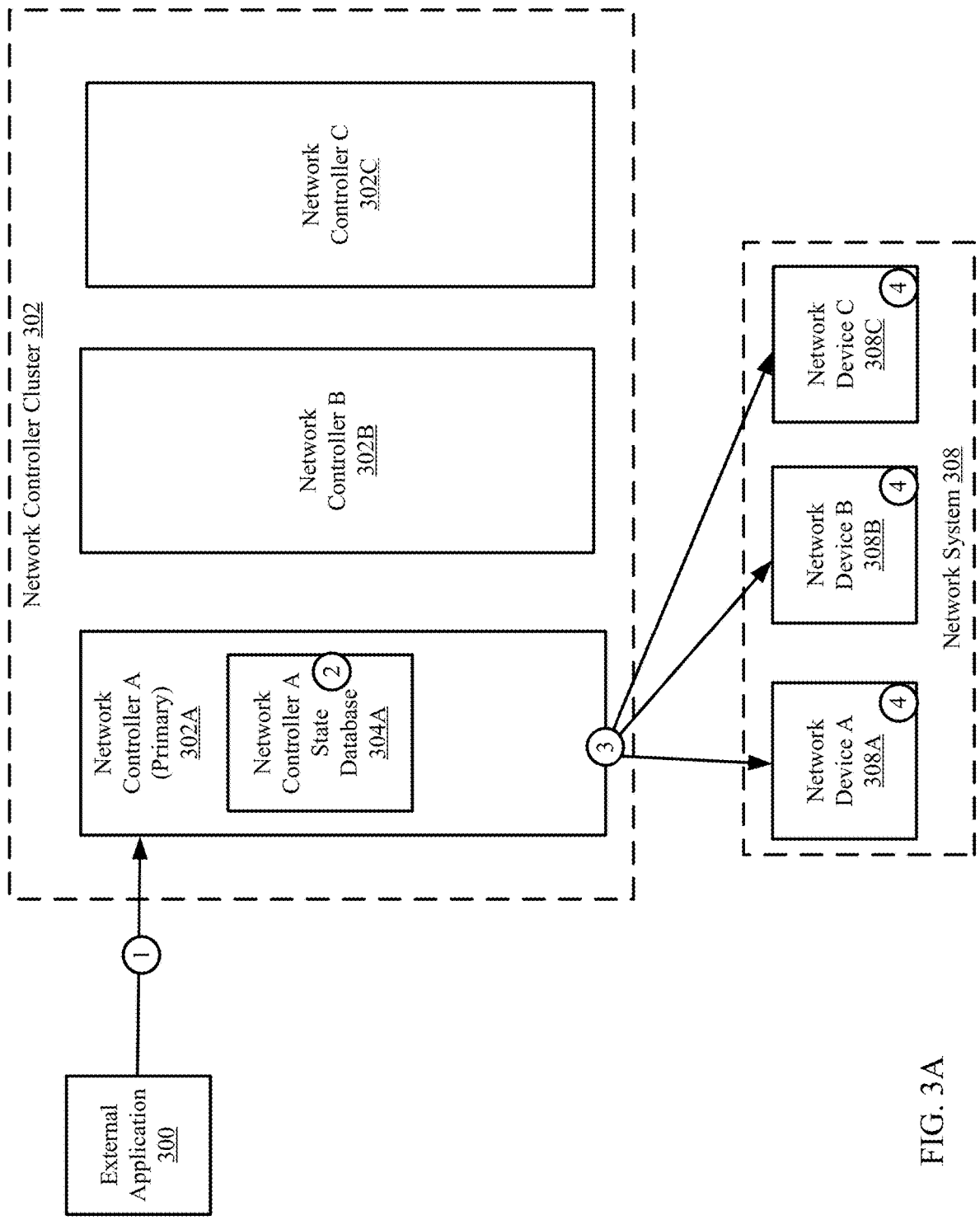
FIGS. 3A-3C shows an example in accordance with one or more embodiments described herein.
Figure 3B:
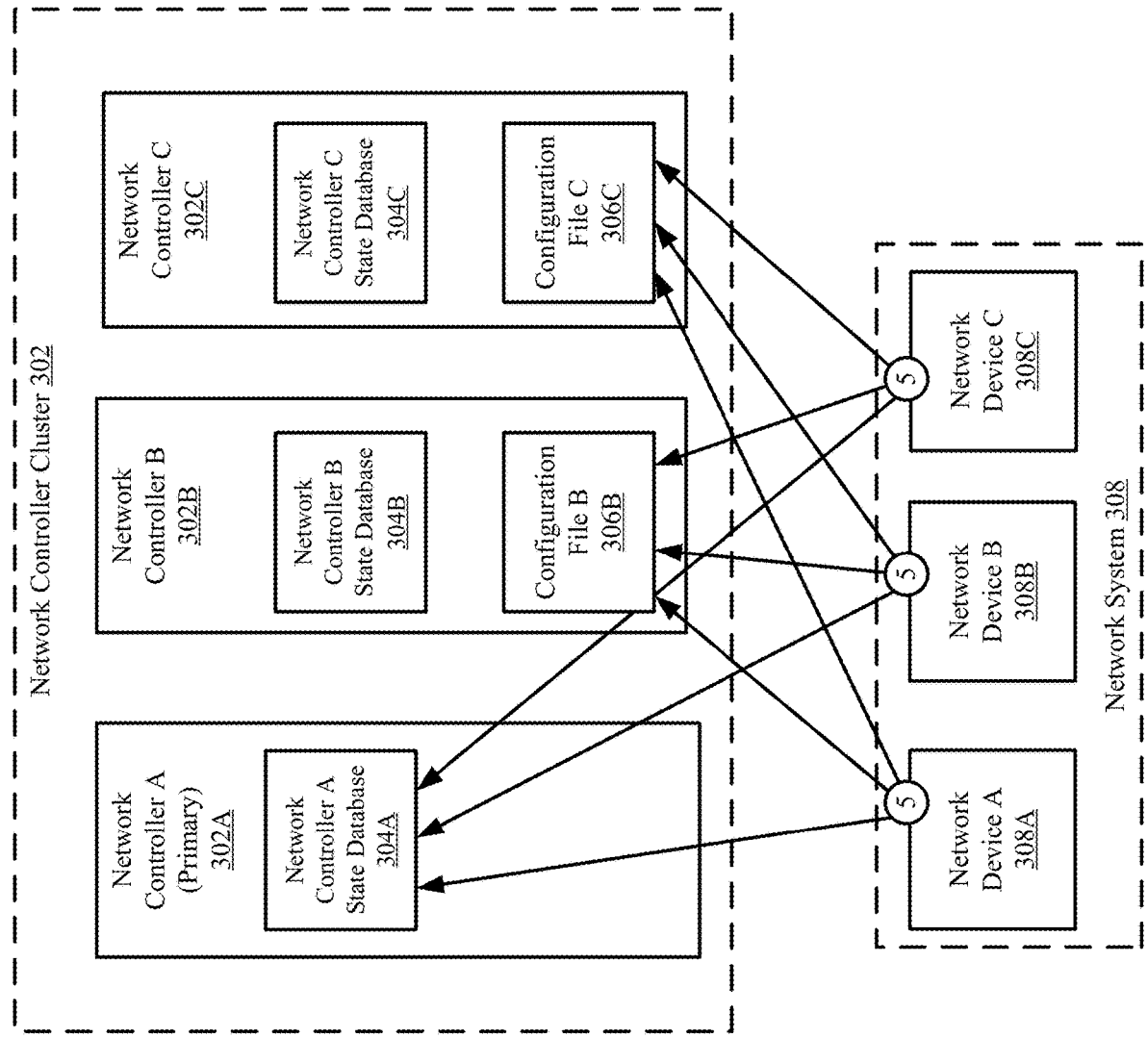
Figure 3C:
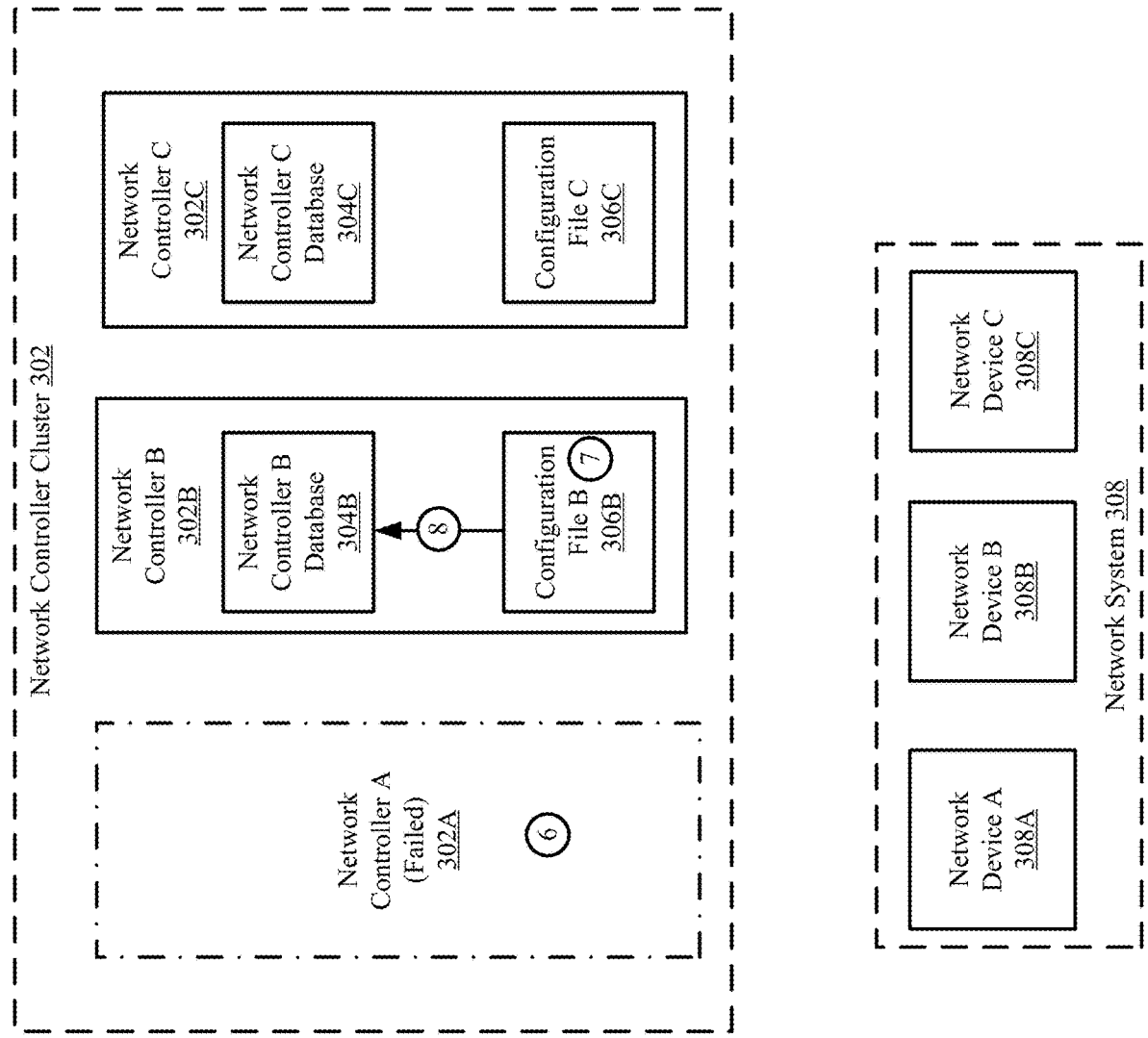

FIGS. 3A-3C show an example in accordance with one or more embodiments of the invention. The example is not intended to limit the invention. Turning to the example, consider a scenario in which a client device communicates with a network controller cluster to stream media. The external application (300) (which is executing on the client device (not shown)), sends a command to a network controller (302A) in a network controller cluster (302) that serves as the primary network controller [1]. The primary network controller (302A) locally stores the command as NDSI in the network controller state database [2]. After processing the NDSI by the primary network controller (302A), the primary network controller sends the resulting NDSI to network devices (308A, 308B, 308C) of a network system (308) [3]. The network devices (308A, 308B, 308C) each store the NDSI and then generate and store updated NDSI in their respective local network device state databases to generate updated NDSI [4]. The updated NDSI of each network device (308A, 308B, 308C) is sent to each network controller (302A, 302B, 302C) in the network controller cluster (302) (e.g., by mounting the NDSI data locally) [5]. While the second network controllers (302B, 302C) each store the updated NDSI in local configuration files (306B, 306C), the primary network controller A (302A) stores the updated NDSI in its network controller state database (304A).

At a later point in time, the primary network controller (i.e., 302A) becomes unavailable [6]. The network controller cluster metadata (not shown) of each remaining network controller (302B, 302C) is updated to specify the unavailability of network controller A (302A). Further, the network controller metadata is updated to specify that network controller B (302B) is to assume the role of primary network controller. Network controller B (302B), based on this determination, makes a selection of NDSI of a network device from its local configuration file. Network controller B (302B) has the option to select network device A (308A), network device B (308B) or network device C (308C) and, in this example, selects network device C (308C). Network controller B (302B) loads the NDSI of network device C (308C) from the configuration file (306B) into the network controller state database (304B) of network controller B (302B) [7]. In this manner, network controller B (302B) is equipped to resume operations as the new primary network controller.

End of Example

Figure 4:
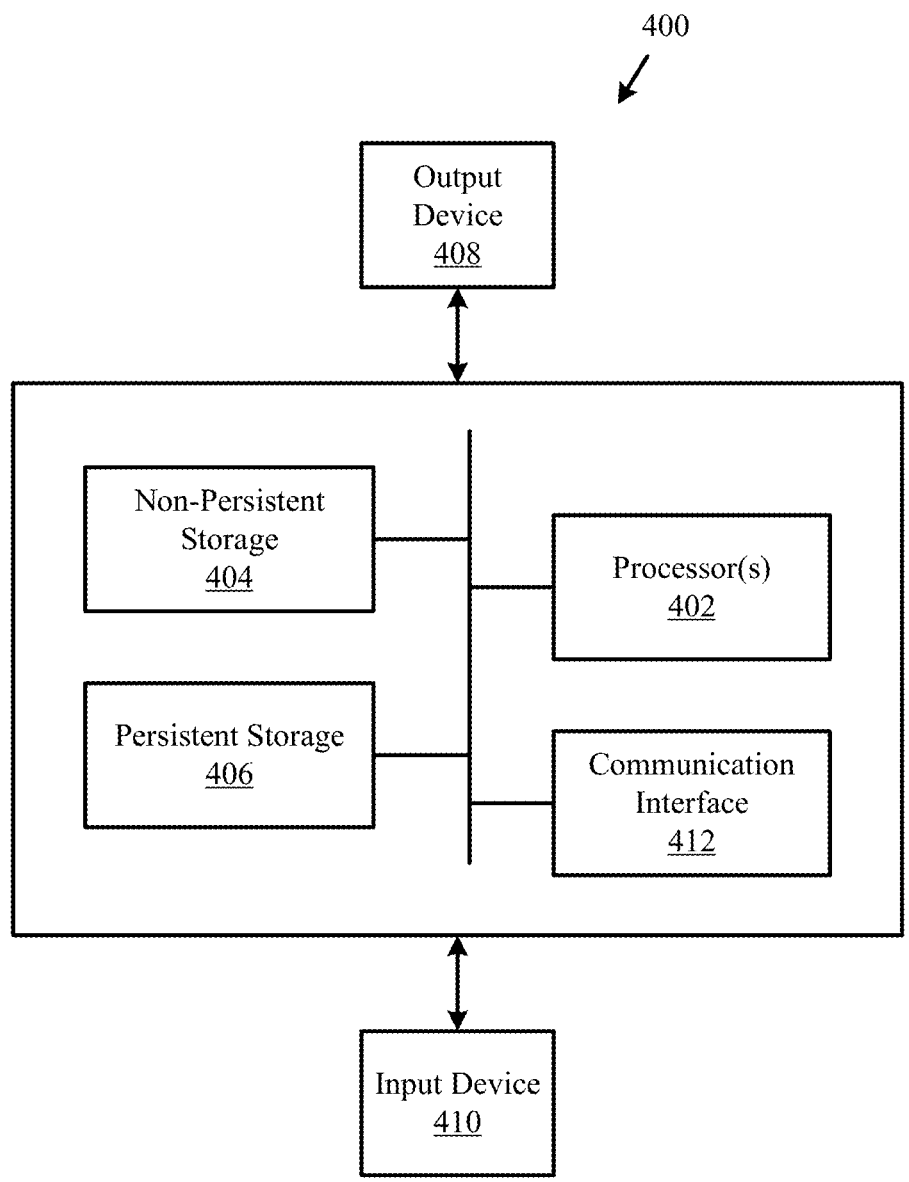
FIG. 4 shows a diagram of a computing device in accordance with one or more embodiments described herein.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of the components illustrated in FIG. 4 is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments described herein allow for the operation of a network controller cluster to continue operation in the event of a failure of a primary network controller in the network controller cluster. Embodiments of the invention implement distribution of NDSI to all network controllers in the network controller cluster as provided by the network devices in a network system. The aforementioned distribution enables any network controller to utilize synchronized NDSI to initiate operation of the primary network controller at any point in time.

Further, embodiments of the invention reduce the burden on the external applications to confirm any confirmation of the network controller cluster (e.g., by replaying any configuration of the network devices as requested by the external applications). In some scenarios, the external applications may not be equipped to perform such replay and, as such, without embodiments of the inventions, some configurations maintained by a failed primary network controller may be lost.

Specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing network devices by network controllers in a network controller cluster, the method comprising:
 obtaining, by a network controller of a plurality of network controllers in the network controller cluster, network device state information (NDSI) from a network device of a plurality of network devices, wherein the network controller has a role of a non-primary network controller in the network controller cluster;
 storing the NDSI in a configuration file on the network controller;
 after the storing:
  making a first determination that a role of the network controller has changed to primary network controller in the network controller cluster;
  based on the first determination, selecting the NDSI from the configuration file;
  loading, based on the selecting, the NDSI into a network controller state database on the network controller; and
  initiating, after the loading, management of the plurality of network devices by the network controller using the network controller state database.

2. The method of claim 1, further comprising:
 after the making the first determination:
  receiving, by the network controller, a command from an external application;
  storing the command in the network controller state database, wherein the command comprises second NDSI;
  sending the second NDSI to each network device of the plurality of network devices, wherein the sending is triggered in response to the storing the command;
  obtaining, in response to the sending of the second NDSI, third NDSI from a second network device of the plurality of the network devices; and
  storing the third NDSI in the network controller state database.

3. The method of claim 2, further comprising:
 performing a synchronization analysis based on the second NDSI and the third NDSI; and
 making a second determination that the second network device is synchronized.

4. The method of claim 3, further comprising:
 storing in the network controller state database, based on the second determination, sync information indicating that the second network device is synchronized.

5. The method of claim 2, wherein the third NDSI is based on the second NDSI.

6. The method of claim 2, wherein the second NDSI is an update to the NDSI.

7. The method of claim 2, wherein the storing of the NDSI in the configuration file does not trigger sending the NDSI to the plurality of network devices.

8. The method of claim 1, wherein the configuration file is not stored in the network controller state database.

9. The method of claim 1, wherein the configuration file specifies that the network device is synchronized.

10. A non-transitory computer readable medium comprising instructions that, when executed by a processor on a network controller, perform a method, the method comprising:
 obtaining, by the network controller in a network controller cluster, network device state information (NDSI) from each network device of a plurality of network devices managed by the network controller cluster, wherein the network controller has a role of a non-primary network controller in the network controller cluster;
 storing the NDSI in a configuration file; and
 after the storing:
  receiving a notification that a second network controller in the network controller cluster has failed, wherein the second network controller has a role of primary network controller in the network controller cluster;
  in response to the notification, making a first determination that a role of the network controller has changed to primary network controller in the network controller cluster;
  based on the first determination, loading the NDSI from the configuration file into a network controller state database on the network controller; and
  after the loading, initiating operation of the network controller using the network controller state database.

11. The non-transitory computer readable medium of claim 10, the method further comprising:
 after the making the first determination:
  receiving a command from an external application;
  storing the command in the network controller state database as second NDSI;
  in response to the storing the command, sending the second NDSI to each network device of the plurality of network devices;
  in response to sending the second NDSI, obtaining a plurality of NDSI from each network device of the plurality of the network devices; and
  storing the plurality of NDSI in the network controller state database.

12. The non-transitory computer readable medium of claim 11, the method further comprising:
 performing a synchronization analysis using the plurality of NDSI and the second NDSI; and
 making a second determination, based on the synchronization analysis, that at least a portion of the plurality of network devices is synchronized with the network controller.

13. The non-transitory computer readable medium of claim 11, wherein storing the NDSI in the configuration file does not trigger sending the NDSI to the plurality of network devices.

14. A method for managing a network controller, the method comprising:
 obtaining, by the network controller of a plurality of network controllers in a network controller cluster, network device state information (NDSI) from a network device of a plurality of network devices, wherein the network controller has a role of a non-primary network controller in the network controller cluster and a second network controller in the network controller cluster has a role of primary network controller;
 storing the NDSI in a configuration file on the network controller;
 after the storing:
  making a first determination that a role of the network controller has changed to primary network controller in the network controller cluster;
  based on the first determination, loading the NDSI from the configuration file into a network controller state database on the network controller, wherein the configuration file specifies that the network device was synchronized to the second network controller; and initiating, after the loading, operation of the network controller using the network controller state database.

15. The method of claim 14, further comprising:

after the making the first determination:

storing a command received from an external application in the network controller state database, wherein the command comprises second NDSI; and sending the second NDSI to each network device of the plurality of network devices, wherein the sending is triggered in response to the storing the command.

16. The method of claim 15, wherein the storing of the NDSI in the configuration file does not trigger sending the NDSI to the plurality of network devices.

17. The method of claim 15, further comprising:

obtaining, in response to sending the second NDSI, third NDSI from a second network device of the plurality of network devices;

performing a synchronization analysis based on the second NDSI and the third NDSI; and making a second determination, based on the synchronization analysis, that the second network device is synchronized.

18. The method of claim 17, further comprising:

storing in the network controller state database, based on the second determination, sync information indicating that the second network device is synchronized.

19. The method of claim 17, wherein the third NDSI is stored in the network controller state database.

20. The method of claim 14, wherein the configuration file is not stored in the network controller state database.

* * * * *